United States Patent [19]
Rohling

[11] 3,896,837
[45] July 29, 1975

[54] GAS MIXING APPARATUS PARTICULARLY FOR RESPIRATORS AND MEDICAL DEVICES

[75] Inventor: Holmer Rohling, Reinfeld, Germany

[73] Assignee: Dragerwerk Aktiengesellschaft, Germany

[22] Filed: Oct. 3, 1973

[21] Appl. No.: 402,886

[30] Foreign Application Priority Data
Oct. 13, 1972  Germany............................ 2250174

[52] U.S. Cl. ................. 137/110; 128/210; 137/113
[51] Int. Cl. ............................................. F16k 19/00
[58] Field of Search ............... 137/88, 110, 113, 89; 128/210

[56] References Cited
UNITED STATES PATENTS

| | | | |
|---|---|---|---|
| 2,545,532 | 3/1951 | Stevens | 137/113 |
| 3,583,421 | 6/1971 | Treloar | 137/113 |
| 3,643,677 | 2/1972 | Begleiter | 137/113 |

FOREIGN PATENTS OR APPLICATIONS

| | | | |
|---|---|---|---|
| 1,105,724 | 3/1968 | United Kingdom | 137/113 |

*Primary Examiner*—Robert G. Nilson
*Attorney, Agent, or Firm*—McGlew and Tuttle

[57] ABSTRACT

A gas mixing apparatus for gases under pressure particularly for respirators and medical devices which has a plurality of compressed gas supply lines which are connected to a mixing device for delivery into a mixed gas delivery line includes at least one by pass connected from at least one compressed gas supply line to the delivery line. The by pass line includes an automatically pressure operated shut off valve which is responsive to a drop off in pressure to feed gas through the by pass line to the delivery line. The shut off valve includes a settable spring biased diaphragm which carries a movable valve member which is urged against the valve seat at pressure conditions which are set for the normal operation of the device. The by pass line is open to deliver gas from the compressed air lines to the delivery line whenever the delivery line pressure drops off. A warning signal may also be arranged in the connection and in some instances a compressed gas connection to the by pass line provides means for feeding gas from a separate compressed gas supply in the event delivery pressure drops off.

8 Claims, 2 Drawing Figures

GAS MIXING APPARATUS PARTICULARLY FOR RESPIRATORS AND MEDICAL DEVICES

BACKGROUND OF THE INVENTION

1. Field of the Invention

This invention relates in general to respirator gas supply control devices and in particular to a new and useful apparatus for mixing gases under pressure particularly for mixing gases fed to a delivery line of a respirator or medical device.

2. Description of the Prior Art

A method for mixing gases in a predetermined mixing ratio is known wherein the gases to be mixed flow under the same pressure through a shut off valve into two chambers of adjustable volume until they are filled to a predetermined pressure, whereupon after closing the shut off valves, the gases flow off from the chambers when additional shut off valves are opened and they are discharged into the discharge lines. In this method a gaseous mixture of desired concentration ratio is prepared efficiently by simple means, since the gases to be mixed are introduced under the same inlet pressure into chambers of accurately adjustable size, whereupon after the gases flow off, they mix in the exactly corresponding volume ratio.

A gas mixing apparatus is also known in which a pressure reducing valve for each of the gases to be mixed, expand them to the same pressure. The supply lines of the gases to be mixed are connected to a shutoff valve leading to chambers of predetermined volume, whereby the volume ratio of the chambers corresponds to the desired mixing ratio of the gases. The chambers are connected via shutoff valves with the gas discharge line. In this device each chamber is filled during the filling operation with one of the gases to be mixed, to a desired but equal pressure. Thereafter the gases of both chambers expand to the pressure in the common delivery line, whereby the gases are mixed corresponding to the volume ratio of the chambers. The mixing ratio in the discharge lines is thus determined by the ratio of the volume of each single chamber and can be accurately set in this way.

A method for mixing gases under pressure with the same purpose is also known, in which each of the gases to be mixed fills a chamber of predetermined adjustable volume, by flow through a one of two pressure regulators which are connected to each other in a way such that the discharge pressure from the pressure regulators are in an adjustable predetermined ratio (first pressure ratio regulator). After interrupting the flow of gas, the gases flow off into the discharge lines from the chambers through a second pressure ratio regulator, which is set on the same pressure ratio as the first pressure ratio regulator. In this method with simple means, a gaseous mixture of desired concentration ratio is prepared efficiently, since from each of the gases to be mixed, a respective definite quantity of gas is measured, whereupon after flowing off, these gases mix exactly in accordance with the measured quantity ratio. The chambers may have the same volume and the ratio of the filling pressure of the gases to be mixed can be set according to the desired mixing ratio. In such a simple way the mixing ratio can be set as desired.

There is further known a gas mixing apparatus for gases under pressure for performing the described method, where a respective chamber of predetermined or adjustable volume is connected to the supply lines of the gases to be mixed, through a pressure ratio regulator and through a first shutoff valve. The chambers are connected through a second shutoff valve and a further pressure ratio regulator with the gas discharge line. By using this device the chambers are filled corresponding to the adjustable pressure ratio of the pressure ratio regulator with gases to be mixed thereupon. Upon emptying the chambers, the gases expand through the shutoff valves and the pressure ratio regulator into the discharge line.

The pressure ratio of both pressure ratio regulators is adjustable, but the pressure ratio of the two pressure ratio regulators is the same for a determined mixing ratio. The pressure ratio regulators may be arranged before or after the shutoff valves.

Also is known a method for mixing gases under pressure, particularly for respirators and medical apparatus, wherein the gases to be mixed have adjustable pressures which are always in the same pressure ratio above the critical pressure of these gases. The gases flow off in the mixing line through an adjustable throttle whose sum of resistance is constant. In this method, with simple means a desired concentration ratio is accurately prepared. The concentration ratio does not change with changes of the rate of flow of the gas. By changing the pressure before the throttles, the rate of flow is determined, but the ratio of the gas pressures remains continually the same. On the other hand, by setting the throttles, the mixing ratio is determined and the throttles are adjustable in such a way that the sum of their resistances is constant.

In this method consequently, the rate of flow, and the mixing ratio can be set selectively, with each setting being independent of the other. These selective setting are independent of the counter-pressure in the mixing delivery line. This due to the fact that the inlet pressure of the gases to be mixed is always higher before the nozzles than their critical pressure ratio.

For carrying out this method a gas mixing apparatus is known, which includes an adjustable pressure reducer in each supply line of gases under pressure, before entering the mixed gas line. Both of the reducers expand the gases under pressure to downstream pressures after above the respective critical pressure ratio and continually in the same pressure ratio to each other. Two adjustable throttles, of constant remaining length, are connected together so that the sum of the throttle cross-sections is constant. In this device, by an adjusting of the pressure reducers, the pressure downstream and the rate of flow given by the device, can be set. Hereby the pressure reducers are set so that the pressures after them are continually in the same pressure ratio to each other.

The mixing ratio of the gases to each other can be achieved by adjusting the throttles whose length remains continually constant during adjusting and which are connected together in a way such that the sum of the throttle cross-section is constant.

In the known gas mixing apparatus there is the danger that in the event of the fall-out of one of the gases under pressure to be mixed, such as for example oxygen or compressed air, or in an operational disturbance at the gas mixing apparatus, the gas flow may suffer interruption or drop below a definite level. In the use of respirators or medical devices, this may be connected with danger to life. Consequently the known gas mixing apparatus have to be under permanent supervision.

SUMMARY OF THE INVENTION

The invention provides a gas mixing apparatus which avoids the described shortcomings and in which the gas flow in the mixing gas line may not fail in the event of disturbances in the gas mixing apparatus. The invention relates to a gas mixing apparatus for gases under pressure, particularly for respirators and medical devices having compressed gas supply lines and a mixed gas delivery line. A by pass is provided between a compressed gas supply line and the mixed gas delivery line. The by pass gas line has a shutoff valve that opens when the pressure drops in the mixed gas delivery line below a predetermined pressure. The invention has the advantage that in the case of an interruption of the gas supply, be it due to a pressure drop of one of the supply lines or due to a disturbance in the gas mixing apparatus or the like, a flow of gas continues to flow through the by pass line to the mixed gas delivery line, so that the gas flow is not interrupted. An emergency supply for example for a patient connected to a medical device is kept up. After elimination of the disturbance cause, the gas supply through the by pass line is disconnected automatically or manually.

In case all of the compressed gas supply lines are endangered, they can be connected separately through by pass lines with the mixed gas delivery line, and the shutoff valves in the by pass lines open automatically when the pressure drops in the mixed gas delivery line below a predetermined pressure.

In another embodiment of the invention the mixed gas line is connected to at least one compressed gas container through a shutoff valve, which opens automatically when the pressure drops in the mixed gas delivery line below a predetermined pressure. This embodiment of the invention has the same advantage described above, that in case of an interruption of the gas supply through the gas mixing apparatus, a gas flow continues to pass in the mixed gas delivery line, so that the flow of gas is not interrupted.

It is advantageous to have the opening pressure of the shutoff valve or valves adjustable, so that the gas supply through the by pass line may be set on any desired lesser pressure. The opening pressures of the shutoff valves are advantageously set differentiatedly, so that for example in a disturbance in the gas mixing apparatus, the supply shall at first take place through a selected compressed gas supply line, so that for example at first a certain gas enters the mixed gas delivery line. When however also this compressed gas supply line should stop operating, the by pass line is turned on and its shutoff valve opens when there is a lower pressure in the mixed gas delivery line.

According to a further embodiment of the invention, a warning signal is connected to the mixed gas delivery line, which indicates a pressure drop below the predetermined pressure. The warning signal arrangement may be acoustic. A simple embodiment thereof provides a shutoff valve in the line leading to the warning signal device, which valve opens automatically when the pressure drops in the mixed gas delivery line below a predetermined pressure.

The shutoff valves may be designed in various ways. A simple embodiment thereof is that in which the shutoff valves or the pressure limiting relay is diaphragm controlled. The tension of the spring loading the control diaphragm is advantageously adjustable.

According to a further development of the invention, in the portions of the lines leading to the shutoff valves, check valves are arranged. In a similar way, in the mixed gas discharge line, a check valve may be arranged for example before the entrance into the line. This measure prevents a back-flow of the gases.

Accordingly it is an object of the invention to provide a gas mixing apparatus particularly for respirator use which comprises a plurality of compressed gas supply lines which are connected to a mixing device which mixes the gases in proportions and delivers them to a delivery line and which includes at least one by pass connected from at least one of the compressed gas supply lines to the delivery line and having an automatic pressure operated shutoff valve which is responsive to a drop off in pressure in the delivery line to feed gas through the by pass line to the delivery line.

A further object of the invention is to provide a gas mixing device which is simple in design, rugged in construction and economical to manufacture.

For an understanding of the principles of the invention, reference is made to the following description of typical embodiments thereof as illustrated in the accompanying drawings.

GENERAL DESCRIPTION OF PREFERRED EMBODIMENTS

Figure 1:
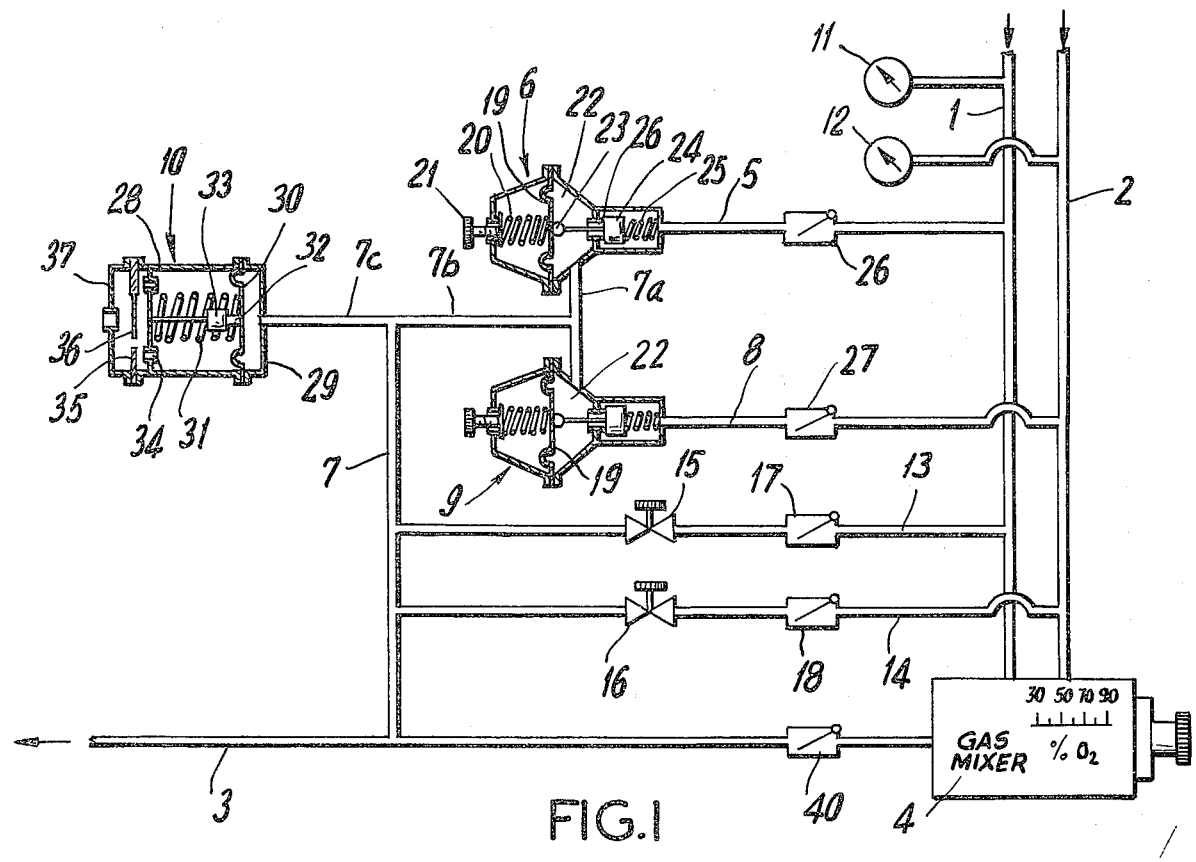
FIG. 1 is a schematic representation of a mixing gas device having a gas supply by pass constructed in accordance with the invention.

Referring to the drawings in particular the invention embodied therein in FIG. 1 comprises two compressed gas supply lines 1 and 2 which are connected to a mixing device 4 having a delivery or discharge line 3.

In accordance with the invention one or more by pass lines are provided from the gas supply lines to the delivery line and in this embodiment two by pass lines including a first by pass line 5 and a second by pass line 8 extend from their respective supply conduits 1 and 2 to the delivery line 3. The by pass line 5 is provided with a shutoff valve 6 which in accordance with the invention comprises a pressure limiting relay. The by pass line 8 has a shut off valve 9 which is of a design similar to that of the shutoff valve 6 and each includes a chamber 22 which is connected through a cross line 7a and a connecting line 7b to the by pass conduit 7 which leads to the mixed gas delivery line 3.

In accordance with a feature of the invention an acoustic warning signal 10 is connected through a branch connection 7c to the by pass conduit 7 and thus also is in communication with the mixed gas delivery line 3.

The pressure in the compressed gas supply lines 1 and 2 are measured by means of pressure gauges 11 and 12. The pressures of these lines 1 and 2 may be in the operating range of from between 4½ up to 8 kg/cm² maximum. The difference in pressure between the inlet pressures of lines 1 and 2 should not exceed 2 kg/cm².

The compressed gas lines 1 and 2 are also connected to respective conduits 13 and 14 which have quick acting valves 15 and 16 respectively which are located downstream of check valves 17 and 18 respectively.

Conduits 13 and 14 connect to the by pass line 7 which connects to the delivery line 3.

The two shut off valves or pressure limiting relays 6 and 9 are advantageously similarly constructed. They each comprise a diaphragm 19 which is biased to an operating position by a spring 20. The biasing force of the spring 20 is adjustable by means of a setting screw 21. A diaphragm chamber 22 is connected to the line 7. A valve tappet or valve stem 23 extends through the diaphragm chamber 22 and it contains a movable valve part 24 which is biased by a spring 25 against a valve seat 26. When the pressure drops in the line 7 because for example of a pressure drop off in the mixed gas delivery line 3 the valve part 24 lifts off the valve seat 26 so that gas from the line 5 can enter into the diaphragm chamber 22 and thence flow through connecting conduits 7a, 7b to the by pass 7 and into the mixed gas delivery line 3. The by pass lines 5 and 8 also carry check valves 26 and 27 respectively.

The acoustic warning signal 10 includes two spaced apart housing walls 28 and 29 and a diaphragm 30 extends across the chamber defined therebetween and is biased by a biasing spring 31. The diaphragm 30 carries a valve seat 32 which in position represented applies firmly against a valve shutoff body 33 which is fixed to the housing wall 28. The acoustical warning signal 10 is shown in FIG. 1 in a position in which the pressure in the mixed gas delivery line 3 has attained its desired set value so that the diaphragm closes the valve body 33 against the valve seat 32. The shut off valves or the pressure limiting relays 6 and 9 are also shown in the position in which the set value in the mixed gas delivery line 3 has been obtained. In such a position a valve part 24 is urged against the seat 26.

When the pressure in the mixed gas line 3 drops below a predetermined value or definite value such as when the gas mixing apparatus is malfunctioning the shutoff valves 6 and 9 and the valve body 33 open so that compressed gas flows through the bore 34 and over a tuning plate 35 and through an air gap (not shown) between the tuning plate 35 and a tuning cord 36 and exits through an opening in a cover 37 whereby the acoustic warning signal sounds. The opening pressure for the shutoff valves 6 and 9 and the acoustic warning signal 10 can be set at any desired value. Thus for example the opening pressures in the two shutoff valves 6 and 9 and the acoustic warning signal 10 may be set at the same value so that all valves open simultaneously.

The check valves 26 and 27 which are located in the by pass lines 5 and 8 respectively and a check valve 40 which is located in the mixed gas delivery line 3 prevent an undesired back flow of the gases.

When only one gas flows out of the compressed gas supply lines 1 or 2 into the gas delivery line 3 the quick acting valves 16 and 17 may be opened just as long as this is desired. When a disturbance in the gas mixing apparatus 4 or at another point causes a continuous noise from the acoustic warning signal 10 a temporary disconnection may be made.

Figure 2:
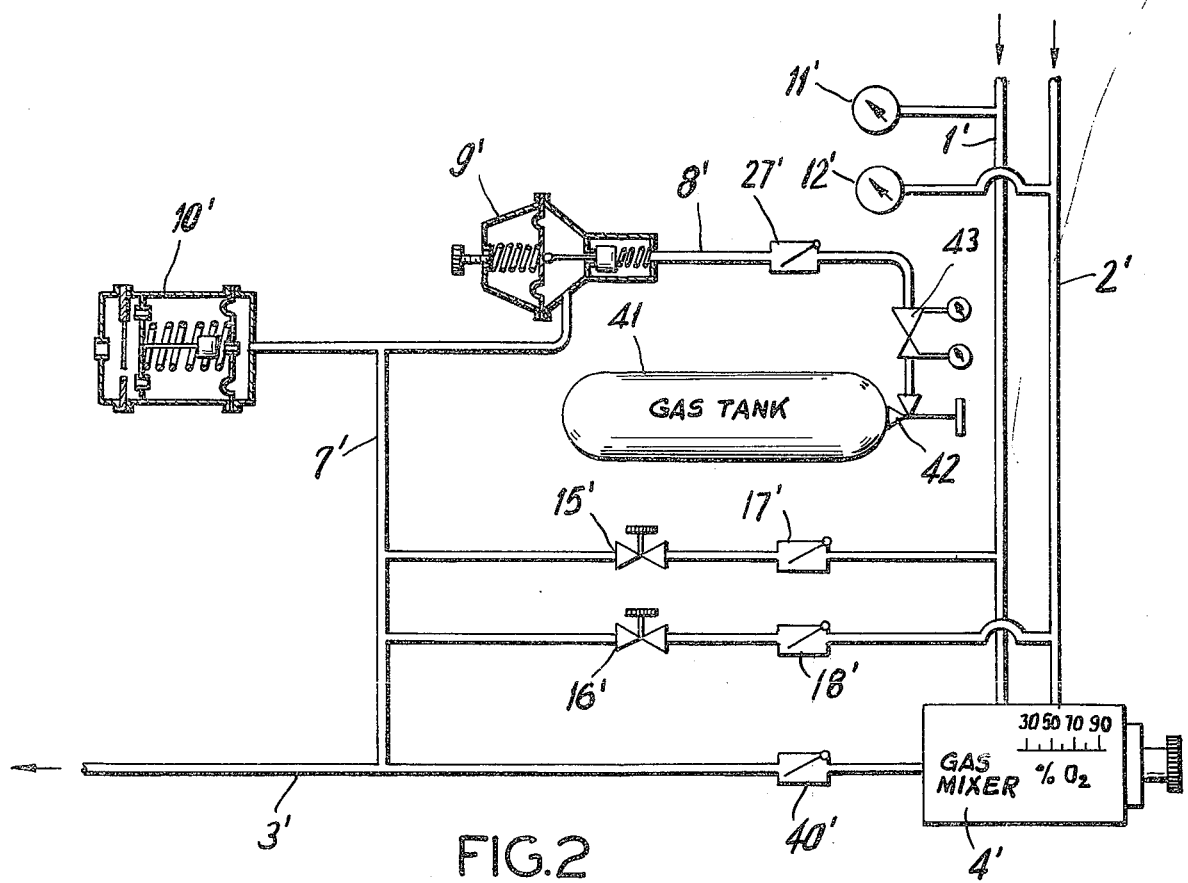
FIG. 2 is a view similar to FIG. 1 of another embodiment of the invention.

In the embodiment shown in FIG. 2 similar parts are similarly designated but with primes. In this embodiment only one shutoff valve or pressure limiting relay 9' is provided in the by pass line 8'. In this embodiment an additional compressed gas storage vessel 41 is connected to the by pass line 8' before a check valve 27' and it is provided with a shutoff valve 42 and also a pressure reducer 43. The compressed gas storage vessel 41 advantageously comprises a compressed gas cylinder which is filled for example with compressed air, oxygen or other gas. By means of the pressure reducer 43 the high pressure of the compressed gas cylinder 41 is reduced to the desired operational pressure.

If the gas pressure in the mixed gas delivery line 3' drops below the pressure on which it is set the shutoff valve 9' opens to connect flow from the compressed gas storage vessel 41 to the branch conduit 7' and to the delivery conduit 3'.

While specific embodiments of the invention have been shown and described in detail to illustrate the application of the principles of the invention, it will be understood that the invention may be embodied otherwise without departing from such principles.

What is claimed is:

1. A gas mixing apparatus for gases under pressure, particularly for respirators and medical devices, comprising a gas mixer device, a plurality of compressed gas supply lines connected to said gas mixer device, at least one mixed gas delivery line extending out of said gas mixer device for the discharge of a mixture of gases from said compressed gas supply lines from said gas mixer device, and at least one by pass line connected from a compressed gas supply line to said delivery line and having an automatic pressure operated shutoff valve therein responsive to a drop in pressure in said delivery line to feed gas through said by pass line to said delivery line whenever the pressure therein drops below a predetermined value, said at least one by pass line comprising a by pass line connected to each of said supply lines each having an automatically operable pressure operated shutoff valve.

2. A gas mixing apparatus according to claim 1, wherein said automatically operable pressure operated shutoff valve includes means for adjusting said valve to vary the pressure in which it opens.

3. Gas mixing apparatus, according to claim 1, wherein the opening pressures of said shutoff valves are set distinctly.

4. Gas mixing apparatus, according to claim 1, including a warning signal arrangement which indicates when the pressure drops below a definite pressure, is connected to said mixed gas delivery line.

5. Gas mixing apparatus according to claim 4, characterized in that the warning signal arrangement is an acoustic warning signal arrangement.

6. Gas mixing apparatus according to claim 5, including a signal conduit leading to the warning signal arrangement 10 having a shutoff signal valve which opens automatically when the pressure in the mixed gas delivery line drops below a predetermined pressure.

7. A gas mixing apparatus for gases under pressure, particularly for respirators and medical devices, comprising a gas mixer device, a plurality of compressed gas supply lines connected to said gas mixer device, at least one mixed gas delivery line extending out of said gas mixer device for the discharge of a mixture of gases from said compressed gas supply lines from said gas mixer device, and at least one by pass line connected from a compressed gas supply line to said delivery line and having an automatic pressure operated shutoff valve therein responsive to a drop in pressure in said delivery line to feed gas through said by pass line to said delivery line whenever the pressure therein drops below a predetermined value, said plurality of compressed air gas supply lines comprising two sets of supply lines said at least one by pass line including a by pass line connected to each separate supply line, each by pass line having a pressure operated shutoff valve including a valve housing having aa diaphragm extending thereacross, adjustable spring means biasing one side of said diaphragm, a movable valve member carried by the other side of said diaphragm, said other side of said diaphragm being connected to said by pass line, said by pass line having a valve seat which is closed by said movable valve member, said diaphragm being movable with said movable valve member upon the reduction of pressure in said delivery line to move said movable valve member off said valve seat and to communicate gas from said gas supply line through said by pass line to said mixed gas delivery line.

8. A mixing apparatus according to claim 7, including a warning signal connected in said by pass line having a movable diaphragm operated valve member which is openable by a reduction of pressure in said delivery line to actuate said warning signal.

* * * * *